United States Patent [19]
Fan et al.

[11] Patent Number: 5,990,827
[45] Date of Patent: Nov. 23, 1999

[54] STRUCTURE OF A POSITION PROCESSING APPARATUS

[75] Inventors: Rodric C. Fan, Fremont; Dave Mleczko, San Jose, both of Calif.

[73] Assignee: Vectorlink, Inc., Fremont, Calif.

[21] Appl. No.: 08/829,453

[22] Filed: Mar. 28, 1997

[51] Int. Cl.⁶ .................................................. G01S 05/02
[52] U.S. Cl. ...................................................... 342/357.11
[58] Field of Search .............................. 342/357, 357.11

[56] References Cited

U.S. PATENT DOCUMENTS

| | | | |
|---|---|---|---|
| 4,807,256 | 2/1989 | Holmes et al. | 375/344 |
| 5,021,792 | 6/1991 | Hwang | 342/357 |
| 5,268,695 | 12/1993 | Dentinger et al. | 342/357 |
| 5,534,875 | 7/1996 | Diefes et al. | 342/357 |
| 5,548,293 | 8/1996 | Cohen | 342/357 |

*Primary Examiner*—Mark Hellner
*Attorney, Agent, or Firm*—Skjerven, Morrill, MacPherson, Franklin & Friel LLP; Edward C. Kwok

[57] ABSTRACT

A method and apparatus for determining attitude information using a down conversion reference and a carrier phase and code phase generator. The apparatus uses individual phase registers for signal received from each antenna to solve the phase difference concurrently. The invention also discloses an attitude sensing method where only one receiving antenna is required. A method and structure for using variable correlation width is also disclosed to optimize noise cancellation under different noise environment.

23 Claims, 6 Drawing Sheets

STRUCTURE OF A POSITION PROCESSING APPARATUS

BACKGROUND OF THE INVENTION

1. Field of the Invention

This invention relates to a global positioning system (GPS) receiver which receives multiple ranging signals to calculate both the position and the attitude of a vehicle. More specifically, this invention relates to the structure of a position processing apparatus which uses the direct code sequence signals from GPS satellites to determine the position and the attitude of a moving vehicle.

2. Discussion of the Related Art

GPS receivers are widely used as navigational tools. An advanced GPS receiver installed in a vehicle, such as an airplane or a boat, receives code sequences from satellites which allows the GPS receiver to measure not only the position but also the attitude of the vehicle. Attitude is defined as the orientation of a vehicle as determined by the relationship between its axes and some reference axes. For vehicles that travel on the surface of the Earth, the reference axes are normally the meridians and the parallels of the Earth. In an aircraft, on the other hand, a third reference axis, an altitude line perpendicular to the surface of the Earth is also used. Thus the attitude of an aircraft includes three components: roll, pitch and yaw.

Compared to a position calculation, an attitude calculation is very sensitive to errors. For example, the antennae receiving the different satellite code sequences must be placed apart from each other at a distance less than the carrier wavelengths of the GPS signals, absent the use of some sophisticated anti-ambiguity technique. Thus, since such carrier signals are typically no more than a few inches long, a small, non-systematic error in a distance measurement may result in a large error in the attitude calculated.

One conventional technique for calculating attitude uses a fully redundant carrier tracking circuit. Under this approach, a separate code sequence processor is provided for each of the antennae, so that each code sequence is assigned to be processed concurrently and independently of the other code sequence processors. Because of this fully redundant design, a GPS receiver built under this approach is typically large and expensive.

One method to reduce the size and cost of such a GPS receiver is taught in U.S. Pat. No. 5,268,695 ("Dentinger '695 patent") to M. Dentinger, filed Oct. 6, 1992, issued on Dec. 7, 1993. The Dentinger '693 patent teaches multiplexing the antenna signals through one processing unit, where code sequences from different antennae are acquired at different times and are compared against each other. However, since the attitude of an aircraft changes between code sequence acquisitions, the Dentinger '695 patent's approach is unsuitable for use in an aircraft or a similarly fast-moving vehicle. Moreover, since each code sequence is processed under the control of a different clock signal, the Dentinger '695 patent's approach is not capable of concurrent common-phase error cancellation, thereby resulting in a significant error in the calculated attitude.

To synchronize with the received code sequence of a GPS signal, a GPS receiver typically uses a phase-locked loop to obtain a "code lock" using a locally generated code sequence. Code lock can be achieved by minimizing the phase "lead" of the local code sequence relative to the received code sequence ("early lock"), or by minimizing the phase "lag" of the local code sequence relative to the received code sequence ("late lock"). For a GPS receiver with a wide correlation width, i.e. a GPS receiver capable of achieving code lock over a wide phase range, the lock condition is more susceptible to signal distortion such as multipath which can result in an undesirable error in the pseudo range calculation. Thus, some GPS receivers use a narrow correlation width. However, when noise or a phase drift is present in the GPS carrier signal, the narrow correlation width used in this technique is often inadequate to provide a stable code lock, resulting in frequent out-of-lock conditions.

SUMMARY OF THE INVENTION

The present invention provides a new GPS receiver in which separate correlators and carrier phase registers are used for code sequence processing. The correlators and carrier phase registers share a common local code generator and a common carrier code recovery circuit. In addition, the GPS receiver of the present invention concurrently compares carrier phases of the received code sequences. Further, the common local code generator generates variable width code sequences for optimum code lock and the positioning accuracy is enhanced using differential correction technique. In this GPS receiver of the present invention, several digital processing channels are dynamically assigned to perform GPS ranging signal processing, differential correction signal processing, or communication signal processing.

The present invention is better understood upon consideration of the detailed description below in conjunction with the accompanying drawings.

DETAILED DESCRIPTIONS OF THE PREFERRED EMBODIMENTS

The three-axis attitude of a vehicle is determined by three fixed points on the vehicle that form a triangle. Thus, to measure the three-axis attitude of a vehicle using positional information from the Global Positioning System (GPS), an antenna is attached to each of the three points. In such an arrangement, except when the antennae are equidistant from a GPS satellite, the GPS signal transmitted from the satellite arrives at each of the antennae at a different time. Hence, for each GPS satellite, the difference in the arrival times of the GPS signal at any pair of antennae defines the relative positions of the pair of antennae with respect to the satellite.

To compute these relative positions, the GPS signal received by each of the antennae is first processed to obtain a code sequence, which is then compared with a locally generated code sequence. A time difference between the code sequence arrival times at any pair of antennae can then be determined. These time differences between arrival times, which represent the different distances from the GPS satellite to the antennae, are then used for attitude calculation.

Figure 1:
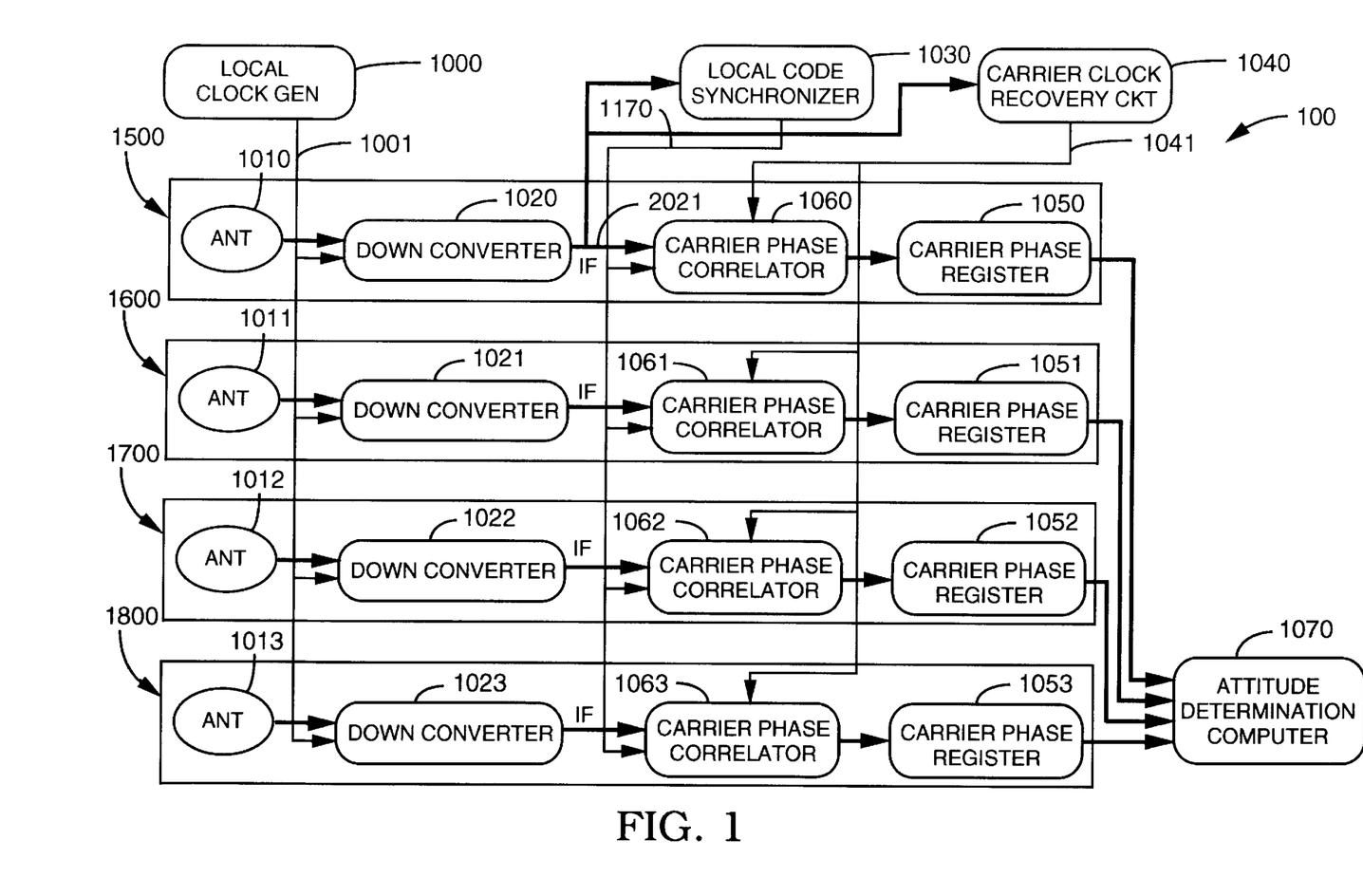
FIG. 1 illustrates an architecture for calculating attitude in a GPS receiver, in accordance with one embodiment of the invention.

FIG. 1 illustrates a circuit for calculating an attitude in a GPS receiver 100, according to one embodiment of the present invention. As shown in FIG. 1, GPS receiver 100 includes four signal processing channels 1500, 1600, 1700 and 1800, each having a separate antenna (e.g. antenna 1010), a down converter (e.g. down converter 1020), a carrier phase correlator (e.g. carrier phase correlator 1060) and a carrier phase register (e.g. carrier phase register 1050). Each of signal processing channels 1500, 1600, 1700 and 1800 can be provided by the same basic circuit, and thus the description below regarding the structure and function of signal processing channel 1500 is equally applicable to signal processing channels 1600, 1700 and 1800. The signal processing channel with the best signal reception is usually selected as the master channel. For illustrative purpose, in this description of GPS 100, signal processing channel 1500 is designated as "master channel", signal processing channels 1600, 1700 and 1800 are designated "slave channels". The master channel designation can be dynamically changed during the operation of GPS receiver 100.

As shown in FIG. 1, a local clock generator 1000 provides a time base for down converter 1020, which demodulates or removes the carrier signal from the satellite signal received at antenna 1010 to provide an intermediate frequency (IF) signal at terminal 2021.

A frequency mixer is used to mix the RF frequency signal with a locally generated reference signal in order to achieve frequency down converting. Phase ambiguity arises because the exact phase relationship between the carrier signal and the resulting IF signal cannot be maintained. This phase ambiguity must be removed, since attitude determination uses the phase angle between signals received at different antennae. The present invention proposes different approaches to solve the phase ambiguity problem.

In one variation of the present invention, no particular effort is made to keep the down converted IF signal in fixed phase relationship with the clock signal at terminal 1001. An anti-ambiguity algorithm in attitude determination computer 1070 (discussed below) is used to remove the phase ambiguities.

In another variation of the present invention, the clock signal and the down converted IF signal are kept in fixed phase relationship with each other using an improved signal down converter. One example of such a signal down converter is shown in FIG. 5.

Figure 5:
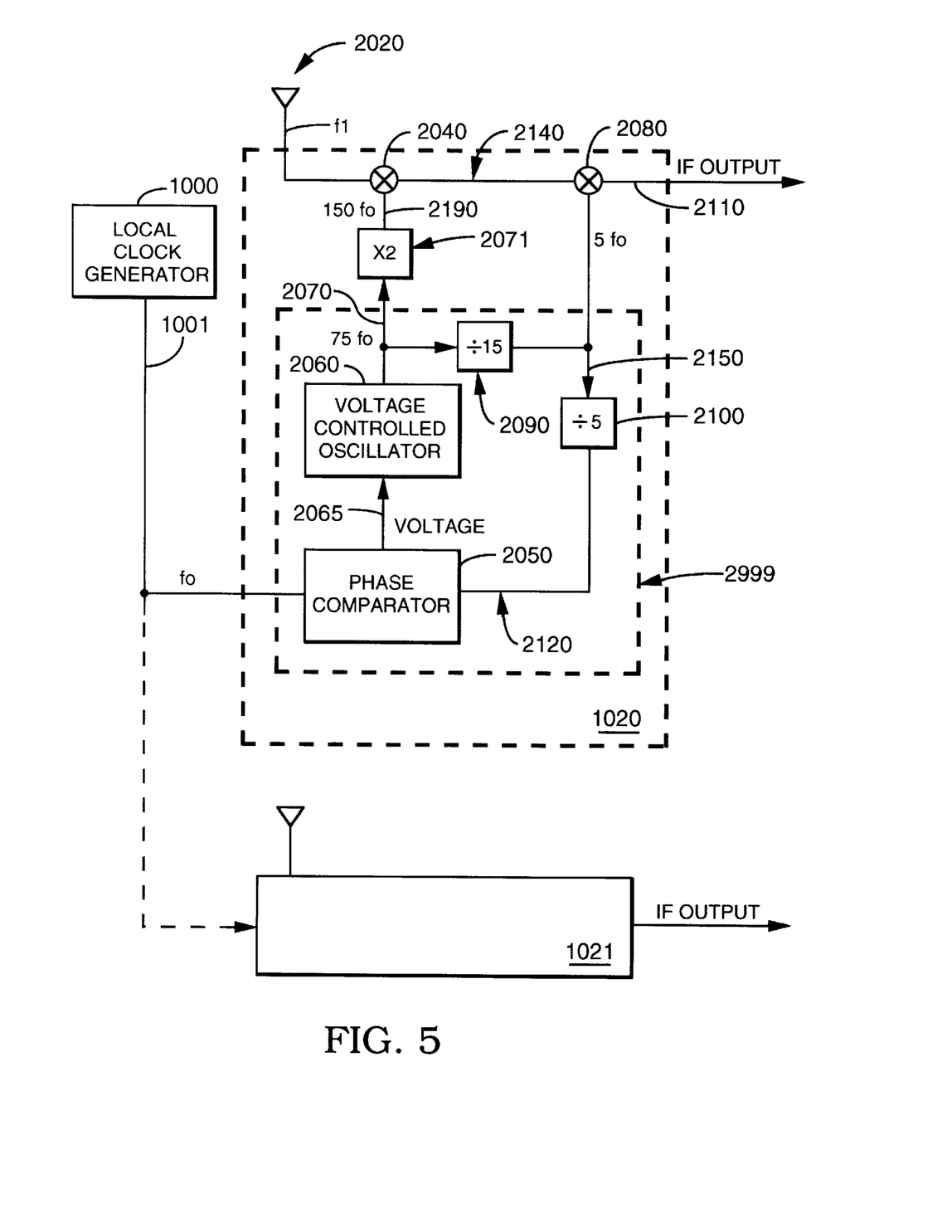
FIG. 5 illustrates a radio frequency (RF) signal down converter used in connection with the present invention.

In FIG. 5, local clock generator 1000 generates a reference clock signal of frequency $f_o$, at terminal 1001, which is provided to phase comparator 2050. Phase comparator 2050 compares the phases of the signal at terminals 1001 and 2120, and generates an error voltage at terminal 2065 based on the phase difference. When the phases of the signal at terminals 1001 and 2120 are the same, the error voltage at terminal 2065 is zero. When the phase angle of the signal at terminal 1001 is ahead of that of the signal at terminal 2120, for example, a positive error voltage is generated at terminal 2065. Conversely, when the phase angle of the signal at terminal 1001 is trailing after that at terminal 2120, a negative voltage is generated at terminal 2065.

Voltage controlled oscillator 2060 receives the error voltage at terminal 2065 and generates a clock signal of frequency approximately 75 times the frequency $f_o$, or $75f_o$, at terminal 2070, according to the magnitude of the error voltage. When a negative error voltage is provided on terminal 2065, voltage controlled oscillator 2060 increases the frequency of the clock and thus advances the phase of the clock signal at terminal 2070. Conversely, when a positive error voltage is provided at terminal 2065, voltage controlled oscillator decreases the frequency of the clock signal and thus delays the phase of the clock signal at terminal 2070. The clock signal at terminal 2070 is multiplied by frequency multiplier 2071 to obtain a second clock signal of a frequency 150 times frequency $f_o$, or $150f_o$, at terminal 2190.

Mixer 2040 mixes the signal from antenna 2020 having a frequency of $f_1$, and the clock signal at terminal 2190 to create a mixed signal. The mixed signal has a high frequency component with a frequency of $(f_1+150f_o)$, and a low frequency component with a frequency of $(f_1-150f_o)$. The high frequency component is filtered out with a low pass filter, and the low frequency component is provided at terminal 2140.

The clock signal $75f_o$ at terminal 2070 is divided by frequency divider 2090 to create a third clock signal of frequency approximately 5 times the frequency $f_o$ at terminal 2150. This clock signal $5f_o$ at terminal 2150 is further divided by frequency divider 2100 to obtain a clock signal $f_o'$ at a frequency approximately $f_o$ at terminal 2120, which is provided to comparator 2050. The clock signal $5f_o$ at terminal 2150 is also provided to mixer 2080 to be mixed with the down converted signal at terminal 2140, to obtain a mixed signal. The mixed signal has a high frequency component, which is filtered out by a low pass filter, and a low frequency component having a frequency approximately $(f_1-150f_o-5f_o)$, which is provided to terminal 2110 as the down converted IF signal.

In the structure described above, voltage controlled oscillator 2060, phase comparator 2050, and dividers 2090 and 2100 form phase lock loop 2999. In phase lock loop 2999, the phase comparator 2050 and voltage controlled oscillator 2060 keeps the clock signal $75f_o$ at terminal 2070 and the clock signal $5f_o$ at terminal 2150 in fixed phase relationship with the clock signal at terminal 1001. Further, because RF signal from antenna 2020 is mixed with the clock signal $150f_o$ at terminal 2190 and again with the clock signal $5f_o$ at terminal 2150, the resulting IF signal at terminal 2110 is also in fixed phase relationship with the clock signal at terminal 1001.

A frequency divider coupled immediately to the input of mixers 2040 and 2080, outside the phase lock loop, may create phase ambiguity at the IF output at terminal 2110. Thus, in accordance with this invention, no frequency divider is used immediately at the input of mixers 2040 and 2080 outside of the phase lock loop.

Referring to FIG. 1, the IF signal represents the received code sequence in the signal processing channel. The IF signal at terminal 2021 is then used as a reference by local code synchronizer 1030 (discussed in further detail below with respect to FIG. 2) to generate or select a locally generated code sequence at terminal 1170, which is provided to each of carrier phase correlators 1060–1063. Carrier clock recovery circuit 1040, also known as coherently regenerated carrier clock circuit, recovers or regenerates a carrier clock signal, which is provided to each of carrier phase correlators 1060–1063 at terminal 1041. A phase difference between the received code sequence of the channel and the regenerated carrier signal is computed by each of carrier phase correlators 1060–1063, based on this regenerated carrier clock signal. The phase difference of each signal processing channel is stored in the channel's carrier phase register (e.g., the phase difference in channel 1500 is stored in carrier phase register 1050).

Attitude determination computer 1070 uses the phase differences stored in carrier phase registers 1050–1053 to calculate the attitude of the moving vehicle on which GPS 100 is mounted. When the antennae are separated by a distance greater than one wavelength of the carrier signal, code aliasing occurs. Attitude determination computer 1070 can be made to resolve the code aliasing to calculate the attitude.

In GPS receiver 100 described above, each of signal processing channels 1500, 1600, 1700 and 1800 has a down converter, a carrier phase correlator, and a carrier phase register, while sharing (i) a common local clock generator 1000, for providing a common clock signal at terminal 1001, (ii) a local code synchronizer 1030, for generating a local code sequence, and (iii) a carrier clock recovery circuit 1040, for recovering carrier signal 1041. Because phase correlators 1060–1063 use the same local code sequences and the same carrier signal for processing code sequences received from different antennae, concurrent carrier phase comparisons are achieved, thereby eliminating common-phase errors. In addition, GPS receiver 100 of FIG. 1 has reduced complexity and cost over prior art GPS receivers, because sharing local code synchronizer 1030 and carrier clock recovery circuit 1040 reduces the cost and the complexity of the GPS receiver.

In the present embodiment, attitude determination computer 1070 includes a microprocessor programmed for attitude calculation. Alternately, a portable computer, such as a laptop computer, running a real time attitude calculation program is also suitable. When a portable computer is provided to implement attitude determination computer 1070, one or more I/O ports of the portable computer are configured to receive data from carrier phase registers 1050–1053.

Although a three-axis attitude can be calculated using three antennae, four or more antennae are preferred. In such a configuration, a master antenna can be used as a reference for three slave antennae, which are used to obtain the time or phase differences described above. Similarly, when a two-axis attitude is required, two or more antennae are required.

Figure 4A:
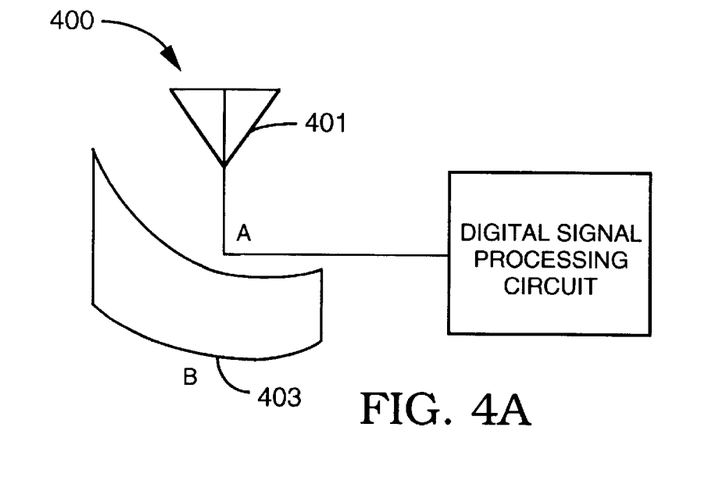
FIGS. 4A, 4B and 4C illustrate a single antenna GPS attitude receiver 400, in one embodiment of the present invention.

Another method of the present invention requires only one antenna for obtaining an one-axis attitude estimate. FIG. 4A illustrates a GPS receiver 400 which uses one antenna for estimating an attitude. As shown in FIG. 4A, antenna 401 installed at position A is shielded by a removable plate 403 installed at position B. Plate 403 can be made out of metal or an otherwise electrically conductive material. During initial data acquisition, plate 403 is removed to allow antenna 401 to have maximum exposure to the GPS satellites. Upon initial satellite "lock-up", the coordinates of the GPS satellites are determined from the ephemeris constants being transmitted from the satellites. The location of the receiver, or the "fix", is also determined. Then, plate 403 is erected. Because RF signals are shielded by plate 403, depending upon the relative position between points A and B, one or more GPS satellites may become invisible to antenna 401. Digital signal processing circuit 402 then determines which GPS satellites become invisible as a result of the shielding effect of plate 403. This information provides the position of the missing satellites relative to plate 403 and antenna 401 and hence can be used to provide an estimate of the attitude. Alternatively, plate 403 rotates around antenna 401 to block, successively, GPS satellites in the lock loop, to obtain a better attitude estimate.

Figure 4B:
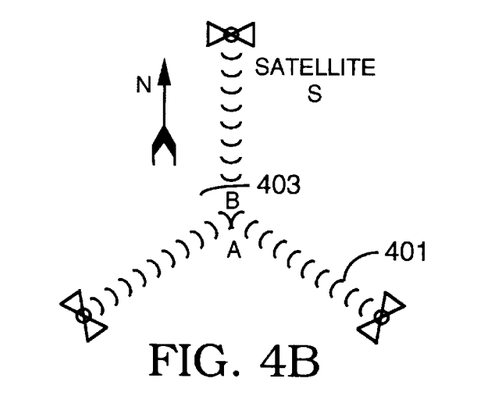

FIG. 4B shows one example of using the system of FIG. 4A for determining attitude. Satellite S is visible to receiver 400 during initial data acquisition, and is determined to be due north of receiver 400. While plate 403 is positioned at B', the signal from satellite S becomes attenuated or lost. Digital signal processing circuit 402 determines that the attenuated or lost signal is from satellite S, and thus estimates that point B' is due north of point A.

Figure 4C:
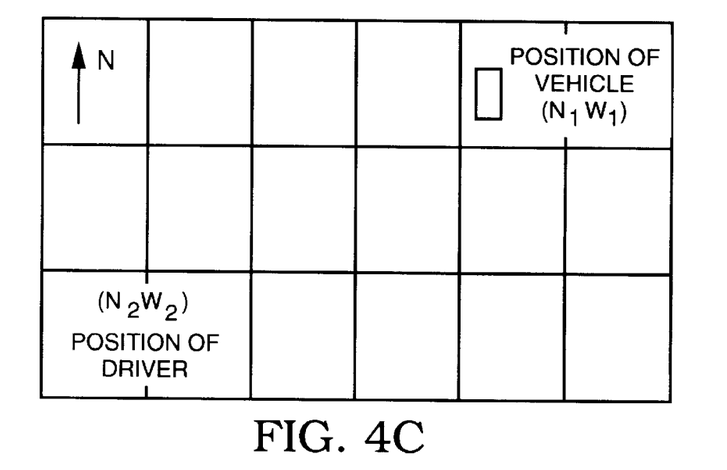

The application of a GPS receiver using the above described principle can be further clearly explained in reference to a specific application. FIG. 4C shows a parking lot where a vehicle is parked at position (N1, W1). Before the driver leaves the vehicle, he turns on a portable GPS receiver made in accordance with the present invention and acquires the fix of the vehicle (N1, W1). This fix is then stored in the memory of the receiver. When the driver returns to the parking lot later to look for the vehicle, he will first turn on the portable GPS receiver. He acquires his present fix (N2, W2), which is displayed on a screen together with fix (N1, W1). The driver, without knowledge as to which direction north is, does not know which direction he should head in order to reach fix (N1, W1). By erecting metal plate 403 of the receiver, the GPS receiver will provide him with the direction in which he should head to reach the vehicle.

Figure 2:
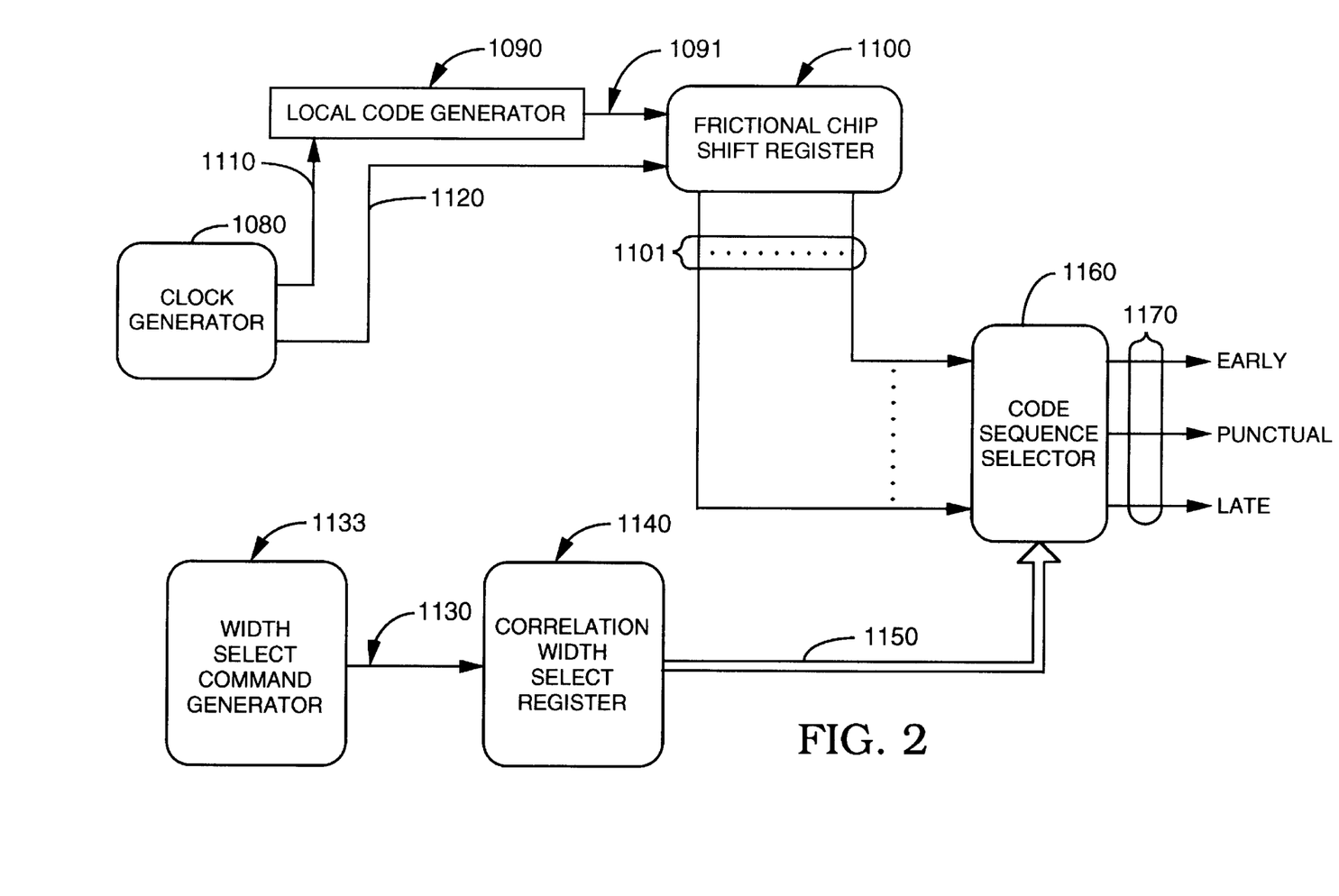
FIG. 2 illustrates a variable width correlator in a GPS receiver according to the present invention.

FIG. 2 illustrates a correlation width adjustment circuit 200, suitable for use in local code synchronizer 1030, according to the present invention. In correlation width adjustment circuit 200, the difference in correlation energies of the "early code", i.e. the local code sequence designed to track a received code sequence with a phase lead, and the "late code", i.e. the local code sequence designed to track a received code sequence with a phase lag, is used to determine the synchronized common code sequence ("punctual code") at terminal 1170.

As shown in FIG. 2, local clock generator 1000 generates two clock signals C1 and C2 with clock signal C1 at terminal 1110 and clock signal C2 at terminal 1120. Clock signal C2 at terminal 1120 has a much higher frequency than the frequency of the clock signal C1 at terminal 1110, thus for each clock cycle of clock signal C1, numerous clock cycles have occurred in clock signal at terminal 1120. Clock signal C1 at terminal 1110 is provided to local code generator 1090, which generates a code sequence at terminal 1091. This generated code sequence is provided to fractional shift register 1100. Fractional shift register 1100 samples an incoming code sequence at terminal 1091 at each clock cycle at terminal 1120 and outputs a large number of code sequences at terminal 1101. The output code sequences each represents the code sequence generated in local code generator 1090 delayed by a number of clock cycles of clock signal C2 at terminal 1120, or equivalently a fraction of the clock cycle of clock signal C1 at terminal 1110.

The fractionally shifted code sequences are provided to code selector block 1160. During initial data acquisition, code selector block 1160 selects a code sequence as punctual code to match with a received code sequence. When the selected punctual code matches the received code sequence to within one data bit, a "code lock" is considered established. Thereafter, an initial correlation width about one data bit wide is stored into width select register 1140. Code selector block 1160, based on the correlation width, selects code sequences of different phases to be used by carrier phase correlators 1060–1063 as the early and the late code sequences at terminal 1170 (FIG. 1).

The correlation width generator 1133 determines whether the correlation width in width select register 1140 requires an update, based on the statistics collected in the environment, including multipath noise, and frequency of early or late lock loop drop out. "Multipath noise" refers to noise arising from reflections of the carrier signal along different paths. When the multipath noise is high, or the phase lock loop drop-out frequency is high, a wider correlation width is provided in width select register 1140. Conversely, when the multipath noise is low, or the phase lock loop drop-out frequency is low, a narrower correlation width is provided in width select register 1140. The correlation width is selected to allow code lock in the presence of phase drift and noise in the carrier signal. Whenever possible, a narrow correlation width is preferred, since it produces a higher attitude accuracy.

In one embodiment of the present invention, correlation width generator 1133 is an integrated circuit which adaptively provides a correlation width according to the magnitude of the multipath noise and the phase lock loop drop-out frequency. Alternatively, correlation width generator 1133 can be provided in the software or firmware of a microprocessor. Correlation width adjustment circuit 200 of FIG. 2 can be used in GPS receiver 100 for determining position as well as attitude.

Figure 3A:
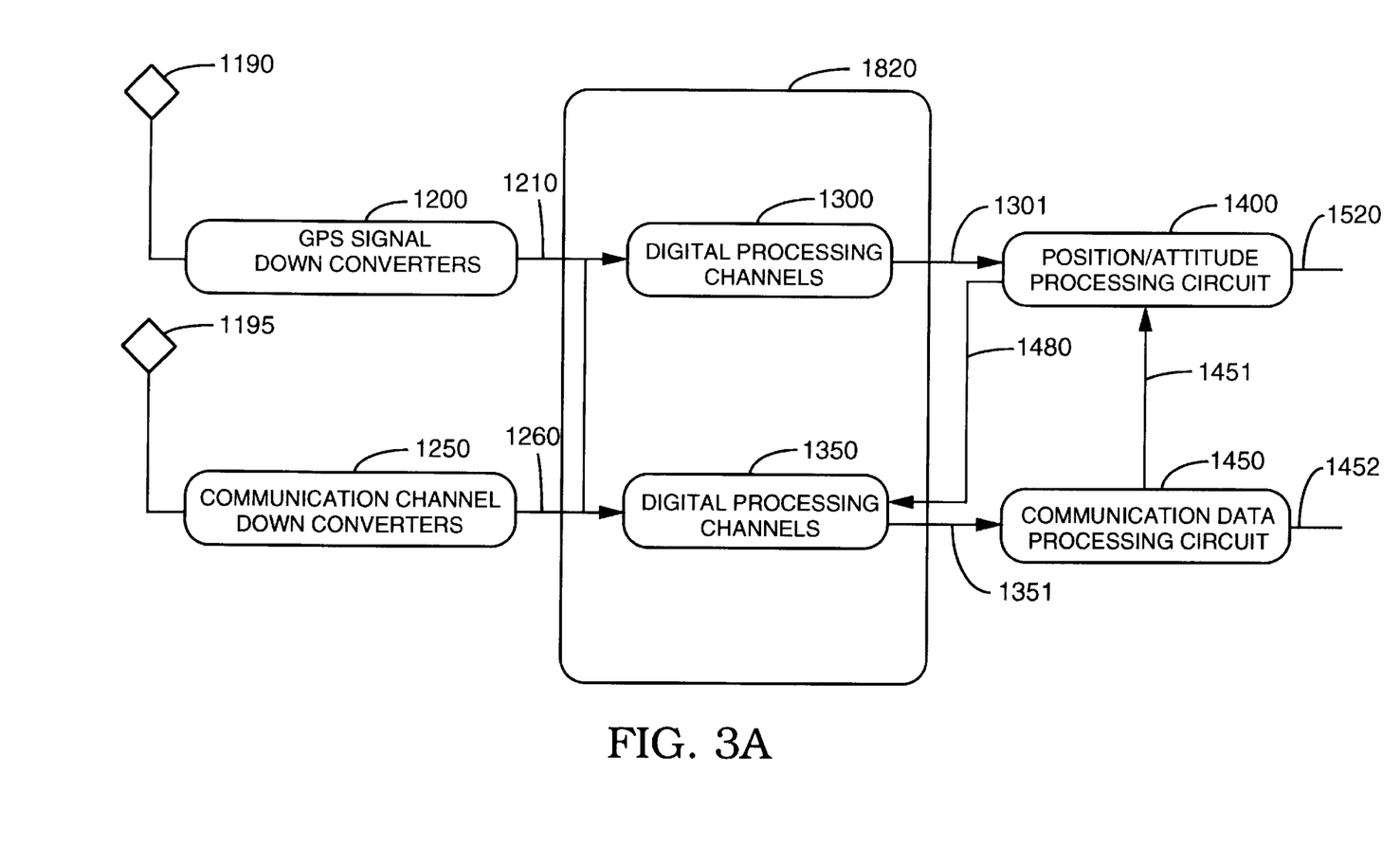
FIGS. 3A and 3B illustrate, in a GPS receiver 300 of the present invention, a digital processing circuit which processes multiple received signals.

FIG. 3A illustrates using a multi-channel GPS receiver 300 to process other signals. As shown in FIG. 3A, a group of signal processing channels ("signal processing channel group") 1300 process GPS satellite signals while signal processing channel group 1350 processes a differential correction signal from a differential GPS system. Each signal processing channel in processing channel groups 1300 and 1350 shares the same local code synchronizer, in the manner described above for local code synchronizer 1030 of FIG. 1, and the same carrier clock recovery circuit, as described above for carrier clock recovery circuit 1040 in FIG. 1.

In a differential GPS system, a ground station at a precisely known location sends out a differential correction signal, which is used in a GPS receiver to refine the position measurement obtained using code sequences received directly from the GPS satellites. Differential correction signal may be transmitted using a data structure similar to a GPS signal except for the code length and the carrier frequency. Thus, a satellite processing channel of a GPS receiver, such as signal processing channel 1500 of GPS receiver 100, can be used for processing GPS satellite signals and differential correctional signals. In FIG. 3A, GPS receiver antennae 1190 represent a group of antennae similar to antennae 1010–1013 of GPS receiver 100 of FIG. 1, while GPS signal down converters 1200 corresponds to a group of down converters similar to down converters 1020–1023 of GPS receiver 100 of FIG. 1. Thus, down converters 1200 demodulate the received GPS signal into IF signals at terminals 1210. The IF signals are processed by digital processing channel group 1300, which are similar to signal processing channels 1500, 1600, 1700 and 1800 of GPS receiver 100. In FIG. 3A, antennae 1195 receive differential correction signals, which are down converted by down converters 1250 into IF signals at terminals 1260. In the present embodiment, IF signals at terminals 1210 and 1260 are modulated at the same IF frequency.

As discussed above with respect to FIG. 1, the IF signals are processed by signal processing channel group 1300 to extract code sequences, which are then provided over terminals 1301 for position and attitude calculation by attitude and position computation circuit 1400. At the same time, IF signals 1260 provided by down converters 1250 are processed in signal processing channel group 1350, which produces processed data signals 1351. Processed data signals 1351 are used in data processing circuit 1450 to provide attitude and position computation circuit 1400 differential correction data on terminals 1451. Attitude and position computation circuit 1400 uses this differential correction data, in conjunction with the GPS derived positional data to provide an accurate estimate of position and attitude. In addition, GPS receiver 300 can also be used to process communication signals, providing output communication data 1452. Examples of such communication signals include text, picture, map, and voice. In GPS 300, attitude and position computation circuit 1400 provides a timing signal 1480, which is used in signal processing channel group 1350 for data acquisition and data synchronization.

Although IF signals 1210 are shown in FIG. 3A to be provided to signal processing channel group 1300, such assignment need not be a fixed one. For example, any of IF signals 1210 can be dynamically assigned to any signal processing channels in signal processing channel groups 1300 and 1350. Thus, during initial data acquisition, signal processing channels in both groups 1300 and 1350 can be used for GPS signal processing. After completing the initial data acquisition and achieving GPS satellite code lock, several of signal processing channels can remain assigned for processing GPS signals, while the other signal processing channels are reassigned for processing GPS differential correction signals or other communication signals.

Using the same signal processing channel design for both GPS signal processing and correctional signal processing significantly reduces circuit complexity. Such a design is particularly amenable to an integrated circuit implementation, since regularly repeated circuit layouts are easily fabricated. In fact, enclosure 1800 of FIG. 3A indicates that signal processing groups 1300 and 1350 can be fabricated on a single integrated circuit. Alternatively, an integrated circuit implementation may include on each integrated circuit four such signal processing channels. If a local code synchronizer input pin and a carrier clock signal input pin are provided on each integrated circuit, several integrated circuits can be moduled together. Thus, such an integrated circuit can be used as a building block for a complex GPS receiver. As an example, if a GPS receiver design requires fifteen signal processing channels, four of the above-mentioned four-channel integrated circuits can be used. In this situation, fifteen signal processing channels on the integrated circuit are used, leaving one signal processing channel unused.

Figure 3B:
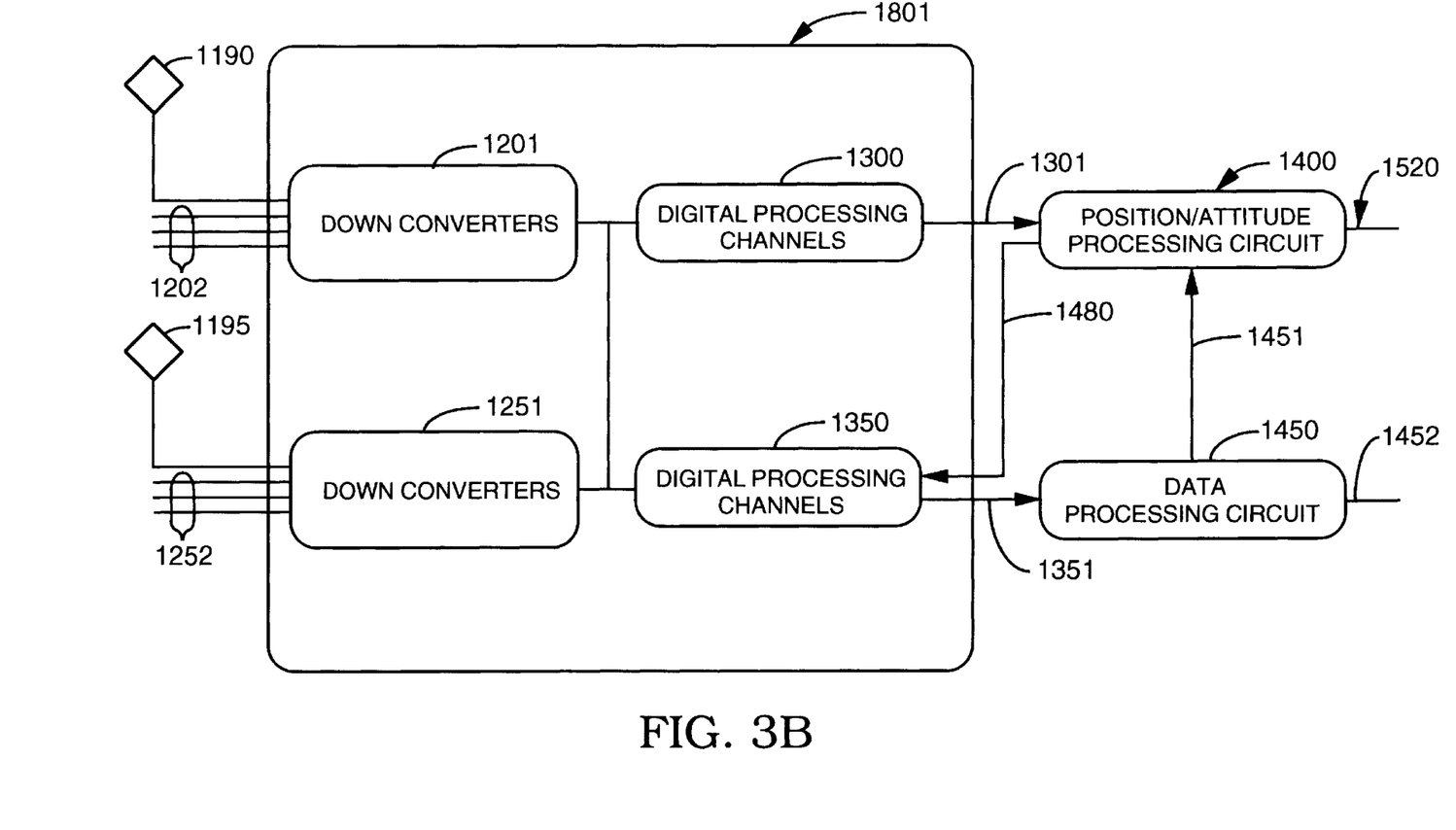

FIG. 3B shows an alternative implementation of GPS receiver 300 in which down converter groups 1201 and 1251, which correspond to down converter groups 1200 and 1250 of FIG. 3A, are implemented in the same integrated circuit 1801 as signal processing channel groups 1300 and 1350. In integrated circuit 1801, the down converters of down converter groups 1201 and 1251 are each provided an input signal frequency select pin, shown in FIG. 3A as pins 1202 and 1252, for specifying a carrier frequency for the corresponding down converter, using an appropriate voltage.

Although the invention has been described in connection with several embodiments, the invention is not limited to the embodiments discussed. Numerous modifications and variations based on the principles disclosed above are within the scope of the invention. For example, even though the signal processing channel design above is described in connection with a GPS receiver, such a design can be used in other telecommunication applications, such as wireless telephony. The present invention is only limited by the following claims.

We claim:

1. A global positioning system receiver, comprising:
   a local clock generator circuit generating a clock signal;
   a local code synchronizer circuit generating a local code;
   a carrier clock recovery circuit generating a carrier clock signal;
   a plurality of antennae installed at different locations for receiving a plurality of ranging signals;

a processing circuit for processing said ranging signals and for determining carrier phase differences between said ranging signals, said signal processing circuit being coupled to receive said clock signal, said local code, and said carrier clock signal; and an attitude determination computer for determining an attitude of said platform based on said carrier phase differences.

2. A global positioning system receiver of claim 1, wherein said processing circuit further comprises:

a plurality of down converters each coupled to receive one of said ranging signals, each down converter receiving said clock signal;

a plurality of carrier phase correlation and registration circuits each assignabally coupled to one of said plurality of down converters, each carrier phase correlation and registration circuit being coupled to receive said local code and said carrier clock signal.

3. A global positioning system receiver in claim 2, wherein said down converter comprises:

a phase comparator;

a voltage controlled oscillator coupled to said phase comparator providing an output signal;

a first frequency divider coupled to said voltage oscillator to receive said output signal and providing a first frequency divided output signal; and a second frequency divider coupled to said phase comparator and said first frequency divider to receive said first frequency-divided output signal, said second frequency divider providing a second frequency-divided output signal based on said first frequency divided output signal, wherein said phase comparator compares phases of a local clock signal with said second frequency divided output signal to provide a phase difference signal for controlling said voltage-controlled oscillator.

4. A global positioning system receiver in claim 2, wherein each of said carrier phase correlation and registration circuits comprises a carrier phase correlation circuit and a carrier phase registration circuit.

5. A global positioning system receiver in claim 1, wherein two antennae are used for one-axis attitude solution.

6. A global positioning system receiver in claim 1, wherein three antennae are used for two-axis attitude solution.

7. A global positioning system receiver in claim 1, wherein at least three antennae are used for three-axis attitude solution.

8. A global positioning system receiver in claim 2, wherein at least three antennae are used for three-axis attitude solution.

9. A global positioning system receiver capable of measuring attitude, comprising:

an antenna for receiving a plurality of ranging signals;

antenna attenuating means for selectively attenuating signal reception from a selected direction, an attitude determination circuit for comparing an amplitude of received signal without using said attenuating means and an amplitude with said attenuating means to determine the direction from which the signals originate and thus an estimate of the attitude of the receiver.

10. A global positioning system receiver in claim 9 wherein said receiver determines only one-axis direction angle.

11. A global positioning system receiver, comprising:

a digital signal processing circuit for down converting and correlating a plurality of ranging signals;

a local code synchronizer circuit coupled to said digital signal processing circuit for providing locally generated code sequences to said digital signal processing circuit, said local code synchronizer dynamically adjusts the time difference between an early and a late codes to optimize code sequence matching and satellite lock up.

12. A global positioning system receiver in claim 11, wherein said local code synchronizer further comprises:

a local code generator for generating local code sequences at given time intervals;

a fractional shift register coupled to said local code generator, said fractional shift register generating a plurality of shifted code sequences based on code sequences provided by said local code generator;

a correlation width generator for generating a correlation width based on the receiving environment; and a code sequence selector for selecting properly shifted code sequences based on said correlation width as early, punctual and late codes to be provided to said digital signal processing circuit.

13. A global positioning system receiver in claim 12, wherein said local code synchronizer further comprises a correlation width select register for communicating a time delay between early, punctual and late codes to said code sequence selector.

14. A global positioning system receiver in claim 12, wherein said register receives said time delay from said correlation width generator.

15. A digital wireless communication processing circuit comprising a plurality of digital processing channels each being dynamically assignable to one of a plurality of signal input leads for receiving and processing a plurality of down converted IF global positioning system signals, global positioning system differential correction signal, and communication signal.

16. A circuit in claim 15 wherein said circuit is manufactured on an integrated circuit chip.

17. A circuit in claim 15, further comprising:

a plurality of RF signal down converters each having an input and an output, said input of said down converters being coupled to a plurality of antennae, each of said output being coupled to a corresponding one of said input leads of said digital processing channels.

18. A circuit in claim 17, wherein said circuit is manufactured on an integrated circuit chip.

19. A circuit in claim 17, further comprising a position and attitude determination computer incorporating an algorithm for determining a position and an attitude of said receiver, said computer being coupled to said plurality of digital processing channels for receiving processed global positioning system ranging signal therefrom, and for providing a time signal thereto.

20. A circuit in claim 19, wherein said time signal provided by said computer is used to facilitate the processing of non-global positioning system signal.

21. A circuit in claim 19, wherein said time signal is used to facilitate the acquisition of the communication signal.

22. A circuit in claim 19, wherein said time signal is used to synchronize the data operation.

23. A circuit in claim 19, further comprising a command input port for entering command and control data into the receiver.

* * * * *